United States Patent
McGill

(10) Patent No.: US 7,624,955 B2
(45) Date of Patent: Dec. 1, 2009

(54) COLLAPSIBLE SUPPORT STAND FOR DEVICES, SUCH AS CAMERAS

(76) Inventor: Robert A. McGill, 135 Ridge St., Arlington, MA (US) 02474

( * ) Notice: Subject to any disclaimer, the term of this patent is extended or adjusted under 35 U.S.C. 154(b) by 0 days.

(21) Appl. No.: 11/421,139

(22) Filed: May 31, 2006

(65) Prior Publication Data

US 2007/0278366 A1    Dec. 6, 2007

(51) Int. Cl.
*F16M 11/02* (2006.01)
*A47B 91/00* (2006.01)
(52) U.S. Cl. ............. 248/181.1; 248/187.1; 248/346.06
(58) Field of Classification Search ............. 248/181.1, 248/181.2, 187.1, 176.1, 126, 127, 133, 177.1, 248/346.06, 346.07, 346.3; 361/679.23, 361/679.24
See application file for complete search history.

(56) References Cited

U.S. PATENT DOCUMENTS

| | | | | |
|---|---|---|---|---|
| 2,375,214 A * | 5/1945 | Creedon | ..................... | 248/126 |
| 2,560,884 A * | 7/1951 | Nagourney | ............... | 248/124.1 |
| 2,752,116 A * | 6/1956 | Minnis | ..................... | 248/181.1 |
| 3,704,848 A | 12/1972 | Trebes et al. | ................ | 248/163 |
| 3,733,042 A * | 5/1973 | Jungjohann et al. | ...... | 248/181.1 |
| 3,750,597 A * | 8/1973 | Muns | ..................... | 248/181.2 |
| 3,774,519 A | 11/1973 | Johnson | ......................... | 95/86 |
| 3,800,312 A | 3/1974 | Brandt | ........................ | 354/293 |
| 3,821,771 A | 6/1974 | Johnson et al. | ................ | 95/86 |
| 4,057,816 A | 11/1977 | Killian, Jr. et al. | .......... | 354/293 |
| 4,439,032 A | 3/1984 | Congdon | .................... | 354/293 |
| 4,582,410 A | 4/1986 | Niwaya et al. | .............. | 354/293 |
| 4,648,698 A | 3/1987 | Iwasaki | ...................... | 354/293 |
| 4,899,189 A | 2/1990 | Frost | .......................... | 354/293 |
| 5,027,141 A | 6/1991 | Bowers | ........................ | 354/82 |
| 5,040,759 A | 8/1991 | Wainwright | ................. | 248/186 |
| 5,222,826 A | 6/1993 | Hanke | ......................... | 403/381 |
| 5,230,490 A | 7/1993 | Sloop | .......................... | 248/187 |
| 5,360,194 A | 11/1994 | Jacobson | ..................... | 248/431 |
| 5,664,750 A * | 9/1997 | Cohen | ................... | 248/231.71 |
| 5,708,890 A | 1/1998 | Nakano | ....................... | 396/428 |
| 5,769,369 A * | 6/1998 | Meinel | ..................... | 248/176.1 |
| 5,810,313 A | 9/1998 | Armstrong | ............... | 248/346.2 |
| 6,002,889 A | 12/1999 | Balling et al. | ............... | 396/535 |
| 6,449,438 B1 | 9/2002 | Gennetten | .................... | 396/300 |
| 6,641,095 B2 | 11/2003 | Lindsay | ...................... | 248/167 |
| 6,679,467 B1 | 1/2004 | Softness | ................... | 248/278.1 |
| 6,752,369 B1 | 6/2004 | Cameron | ..................... | 248/500 |
| 6,791,770 B2 | 9/2004 | Yamazaki et al. | ........... | 359/819 |

(Continued)

OTHER PUBLICATIONS

Jim Heid's Macintosh Digital Hub Ste, "The Tiniest Tripod," 4 pages, Jun. 14, 2005 (visited Mar. 28, 2006) <http://www.macilife.com/2005/06/tuesday-is-my-good-news-day-cool-mini.html>.

(Continued)

*Primary Examiner*—Amy J. Sterling
*Assistant Examiner*—Tan Le
(74) *Attorney, Agent, or Firm*—Modern Times Legal; Robert J. Sayre

(57) ABSTRACT

A support stand includes a base and a mounting post that is collapsible into the base. The support stand can be extremely compact and nearly flat with a very small height. The support stand also is very easy to use and can be quickly set up and utilized with a camera or other device to be mounted thereon.

11 Claims, 5 Drawing Sheets

U.S. PATENT DOCUMENTS

| | | | | |
|---|---|---|---|---|
| 6,824,300 B2 * | 11/2004 | Drews et al. | ............... | 362/515 |
| 2001/0012455 A1 | 8/2001 | Mulcahy et al. | ............ | 396/419 |
| 2001/0055486 A1 | 12/2001 | Visram | ...................... | 396/419 |
| 2002/0001470 A1 | 1/2002 | Linnecke | ................... | 396/419 |
| 2003/0156836 A1 | 8/2003 | Ward | ......................... | 396/419 |
| 2004/0076421 A1 | 4/2004 | Linnecke | ................... | 396/419 |
| 2005/0265711 A1 | 12/2005 | Heibel | ...................... | 396/419 |

OTHER PUBLICATIONS

Pedco Product Engineering & Development Company, "Products," 5 pages (visited Mar. 28, 2006) <http://www.pedcopods.com/products.htm>.

Semsons & Co. Inc., "Bottle Cap Tripod for Digital Camera by Yadobashi (6 colors)," 3 pages (visited Mar. 28, 2006) <http://shop.store.yahoo.com/semsons-inc/botcaptripfo.htmp>.

* cited by examiner

COLLAPSIBLE SUPPORT STAND FOR DEVICES, SUCH AS CAMERAS

BACKGROUND

Cameras conventionally are designed with a standard mounting connection, typically a threaded bore with a diameter of about ¼ inch and threaded at a density of 20 threads per inch, extending into the camera from an underside surface. Cameras can be mounted on a support stand via this connection, typically by threading a screw from the support stand into the bore of the camera.

A common structure for a support stand is a tripod including three collapsible legs, each pivotally mounted along with the screw about proximate focal points. Accordingly, the screw can be threaded into the camera and the legs of the tripod can be spread apart. The legs are then mounted on a surface, and the camera can then be turned and pivoted about the tripod to obtain a desired position and orientation for a photograph. Use of a support stand can be particularly advantageous with low-light and group shots.

Although tripods have been made in fairly compact sizes, there are limits to the compactness with which a tripod can be designed, as the legs typically are stacked together and must be of a sufficient length to provide a secure and balanced mounting. Accordingly, tripods are not readily designed to fit easily in, e.g., a photographer's pants pocket or wallet or with a camera inside a camera case. The plurality of adjustable parts can also require considerable time and effort for proper set-up and mounting of the camera.

SUMMARY

Described herein is a new design for a support stand. The support stand includes a base and a mounting post. The mounting post is advantageously collapsible into the base. The support stand can be manufactured in an extremely compact design that is particularly flat or nearly flat with a very small height when the mounting post is collapsed into the base. Accordingly, the support stand can have a size and shape close to that of a thick credit card and can fit in a photographer's wallet or camera case. The support stand can also be designed to be extremely light and yet still be rugged due to the limited number of adjustable parts. Additionally, the use of a wide base provides a low center of gravity and eliminates the need for additional legs or stabilization while providing support for the camera on uneven surfaces, though legs can optionally be provided.

A camera or other device can be mounted on the support stand so as to steady and position the device, as desired. Where the device is a camera, the camera is placed in a desired position for taking a photograph of a subject. The support stand includes a threaded member that can be screwed into a threaded bore in the device. The threaded member is integrally or removably secured to the mounting post, which can be mounted to the base via a ball joint, providing three degrees of rotational freedom for the mounting post. Accordingly, the mounting post can be flipped up and pivoted to move and rotate the threaded member (and the device by extension) to a desired position. As a consequence of its design, the support stand also is very easy to use and can be quickly set up and use. Another advantage of the design of this support stand is that with the mounting post collapsed into the base, there need be no external metal surface to contact (and potentially scratch) the body of the device. Further still, when clamped to the mounting post, the base can be used as a convenient knob for the mounting post so as to facilitate screwing the threaded member into the device by rotating the base, thereby eliminating the need for a separate knob.

BRIEF DESCRIPTION OF THE DRAWINGS

In the accompanying drawings, described below, like reference characters refer to the same or similar parts throughout the different views. The drawings are not necessarily to scale, emphasis instead being placed upon illustrating particular principles of the methods and apparatus characterized in the Detailed Description.

DETAILED DESCRIPTION

Figure 1:
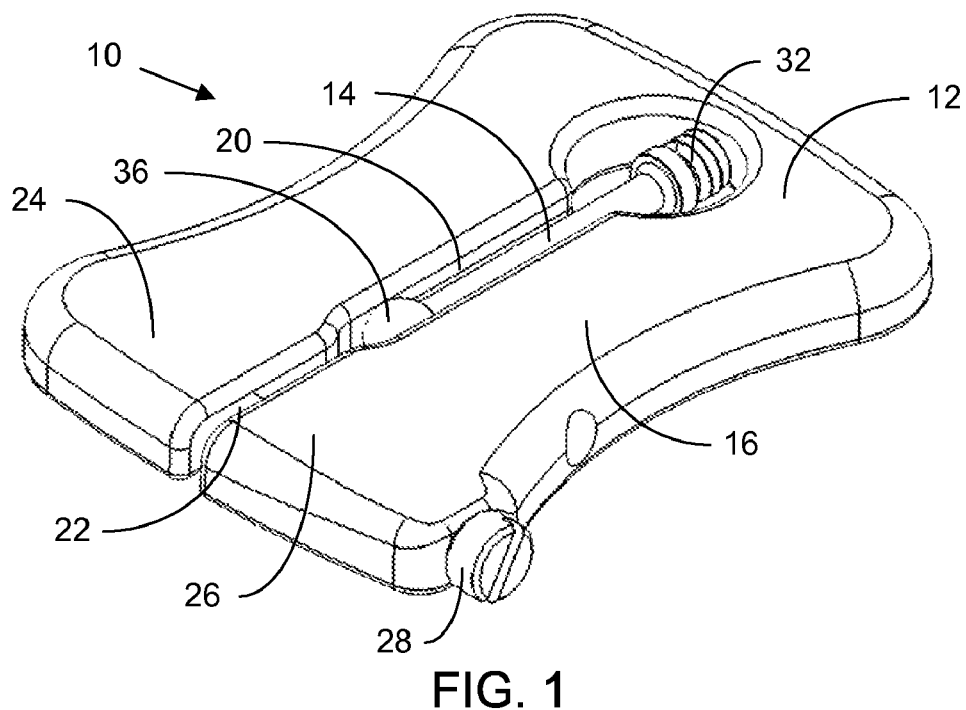
FIG. 1 is a perspective drawing of an embodiment of the support stand with the mounting post collapsed into the platform of the base.
Figure 2:
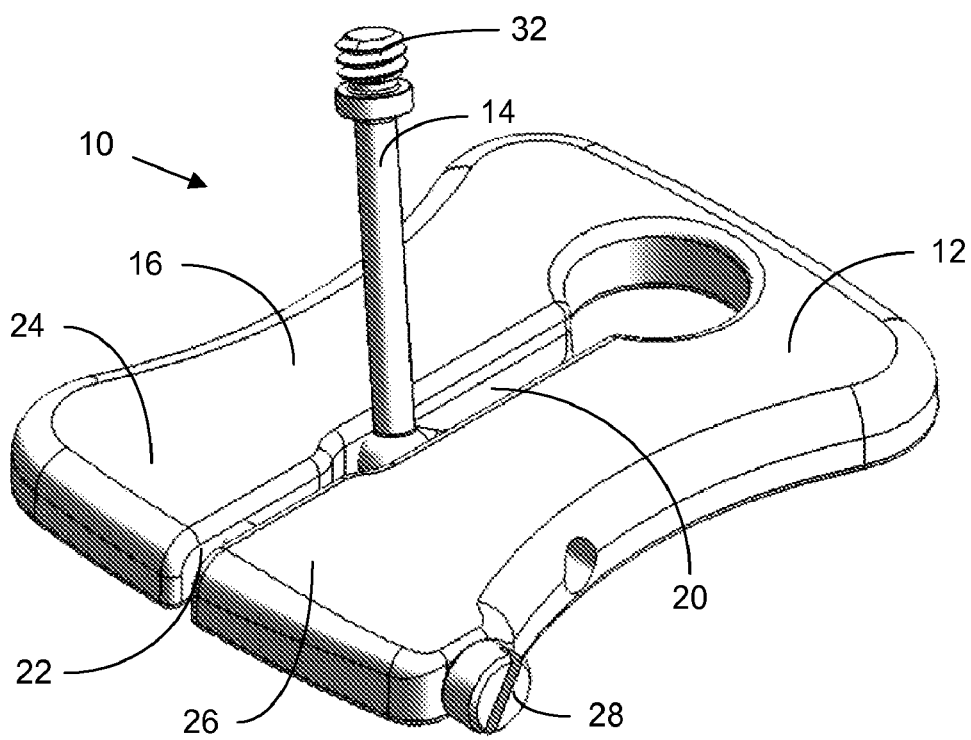
FIG. 2 is a perspective drawing of the support stand of FIG. 1 but with the mounting post extended in an upright position from the platform of the base.
Figure 3:
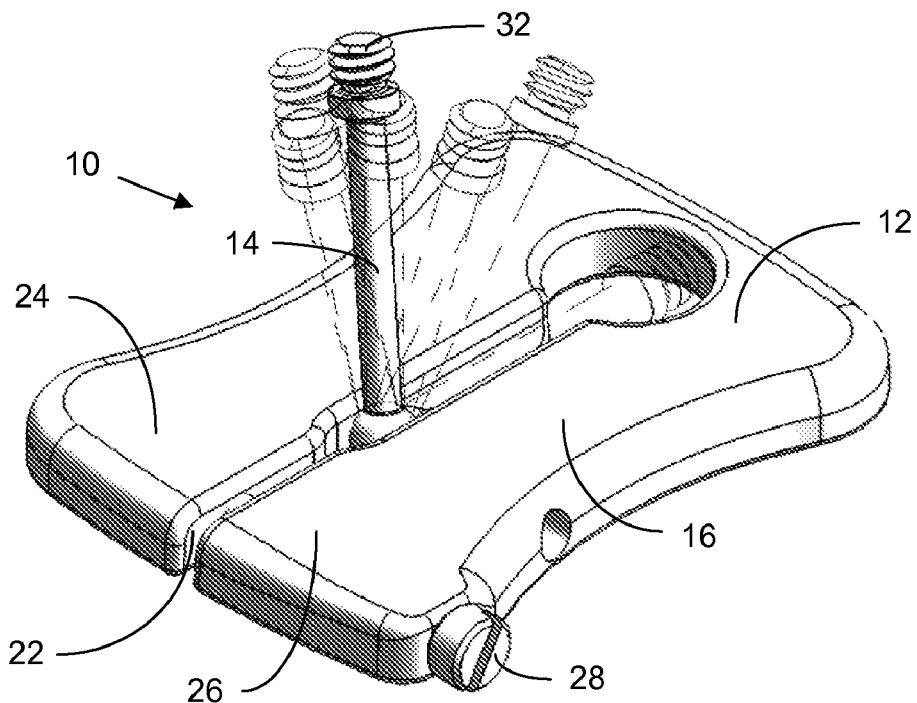
FIG. 3 is another perspective drawing of the support stand of FIGS. 1 and 2 with the mounting post pivoted at various angles from the base.

The support stand 10, embodiments of which are illustrated in FIGS. 1-9, includes a base 12 and a mounting post 14.

The base 12 includes a thin platform 16 extending across a substantially planar section. The platform 16 has a shape resembling that of an hourglass in FIGS. 1-9, though it can be rectangular, triangular or have any of a variety of other shapes. The platform 16 can be formed of plastic or metal and can be fabricated, e.g., via injection molding or machining. A socket (not visible) for a ball joint is defined at or near the center of the platform 16. The socket 18 is shaped with curved surfaces or cylindrical holes to accept and confine a spherical ball 36 with a radius between about 0.5 to about 1 cm therein. Extending from one side of the socket is a receiving slot 20 extending through the platform 16 and sized and configured to receive the mounting post 14 when the mounting post 14 collapsed into the base 12.

The mounting post 14 includes a ball 36 at one end. The mounting post 14 can be pivoted about the ball 36 in the socket 28 of the base 12 so as to be collapsed into the platform 16 or to project in an upright position orthogonal to its collapsed position. Moreover, the mounting post 14 and a device 38 mounted thereon (see FIG. 5) can be repositioned by pivoting about the ball 36 with the following three degrees of freedom: roll, pitch and yaw (i.e., rotated about the ball around each of a transverse axis, a longitudinal axis, and a normal axis, wherein each axis is normal to the other two axes).

Extending from an opposite side of the socket from the receiving slot 20 in the embodiment of FIGS. 1-5 is an expansion slot 22. The expansion slot 22 extends all the way to the edge of the base 12 such that two sections 24 and 26 are separated by the expansion slot 22. The expansion slot 22 can be, e.g., about 2 mm across in a "relaxed state."

In the embodiment of FIGS. 1-5, the base 12 also includes a clamping member in the form of a threaded screw 28 extending through a similarly threaded bore in the platform and across the expansion slot 22. When turned clockwise or counterclockwise, the screw will reduce or increase the width of the expansion slot 22 and correspondingly reduce or increase the diameter of the socket. The screw 28 includes a head (i.e., the portion of the screw that protrudes from the platform 16 in FIGS. 1-5) that contacts an outer edge of the platform 16, serving to pull two sections 24 and 26 of the platform (separated by the expansion slot) closer together, thereby narrowing the expansion slot 22 and reducing the diameter of the socket (to thereby restrict the rotation of a ball 36 on the mounting post 14, discussed below, mounted in the socket) as the screw 28 is tightened into the platform 16. The screw 28 can then be loosened to re-expand the expansion slot 22 and increase the diameter of the socket 18 (to thereby re-afford freedom of rotation to the ball 36 mounted therein).

Figure 6:
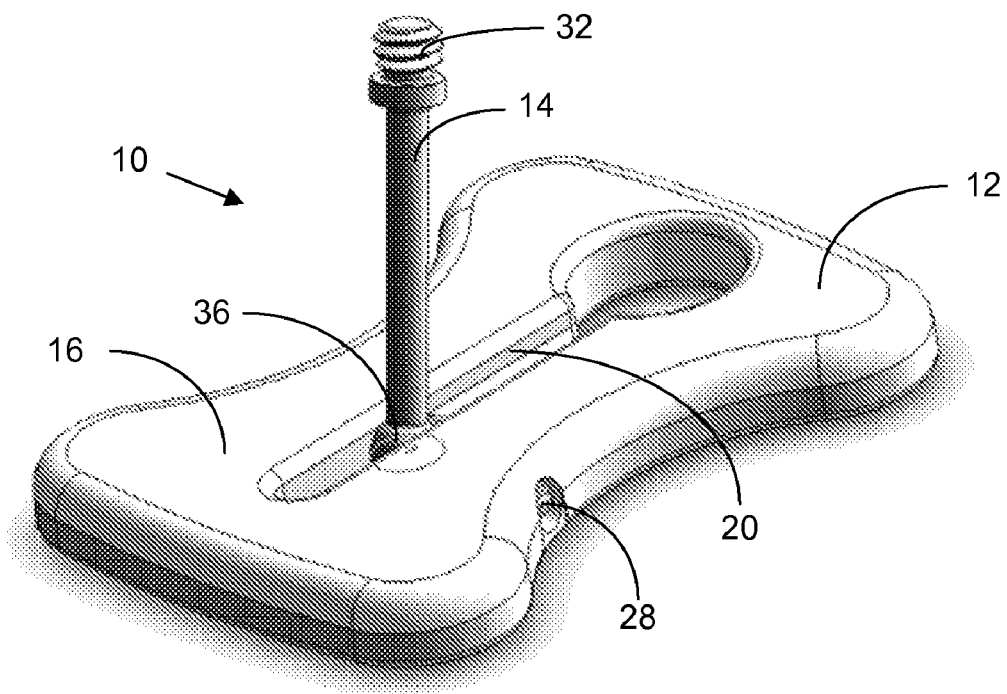
FIG. 6 is a perspective drawing of another embodiment of the support stand with a fully internal slot and a direct press locking the mounting post in an upright position.
Figure 7:
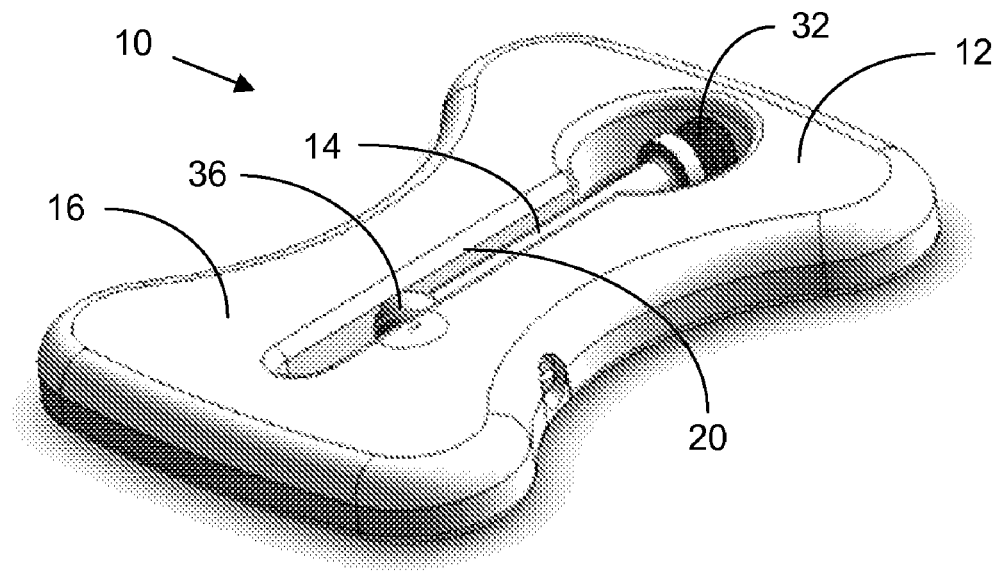
FIG. 7 is a perspective drawing of the support stand of FIG. 6 with the mounting post collapsed into the base.
Figure 8:
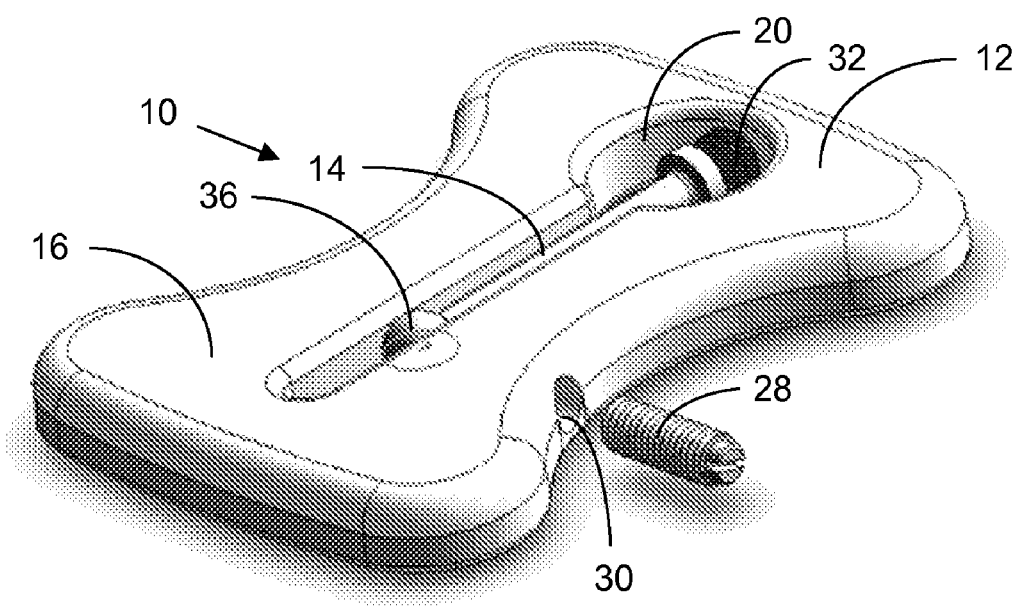
FIG. 8 is a perspective drawing of the support stand of FIGS. 6 and 7 with the screw that serves the direct press on the ball of the mounting post removed.

In the embodiment illustrated in FIGS. 6-8, the support stand 10 includes a fully internal slot 20 and a direct press for locking the position of the mounting post 14. The direct press, here in the form of a screw 28 (see FIG. 8), is mounted in an inversely threaded bore 30 extending from the socket out to the edge of the platform 16. Accordingly, as the screw 26 is screwed into in the bore 30, the screw 26 will make contact with and supply pressure against the ball 36 of the mounting post 14 so as to restrict rotation of the ball 36 in the socket.

The slot 20 is expanded at one end to enable a user to easily insert his or her finger into the expanded end and push the end of the mounting post 14 out of the plane of the platform 16 so that it can be raised to a desired positioned and have a camera or other device mounted thereon. Because the screw 26 applies direct pressure onto the ball 36, the slot 20 in this embodiment need not expand and contract to facilitate locking and release of the ball 36; therefore, the slot 20 need not extend to the edge of the platform 16.

In the embodiments of FIGS. 1-8, a threaded member 32 is integrally attached to the mounting post 14 at an opposite end from the ball 36. The mounting post 14 and the threaded member 32 can be formed of metal (e.g., steel) and fabricated via a machining or casting process. The threaded member 32 has a diameter of about ¼ inch (about 6.5 mm) and 20 threads per inch for a standard threaded mount for a camera. In the embodiments of FIGS. 1-8, the threaded member 32 is integrally attached to the mounting post 14.

Figure 9:
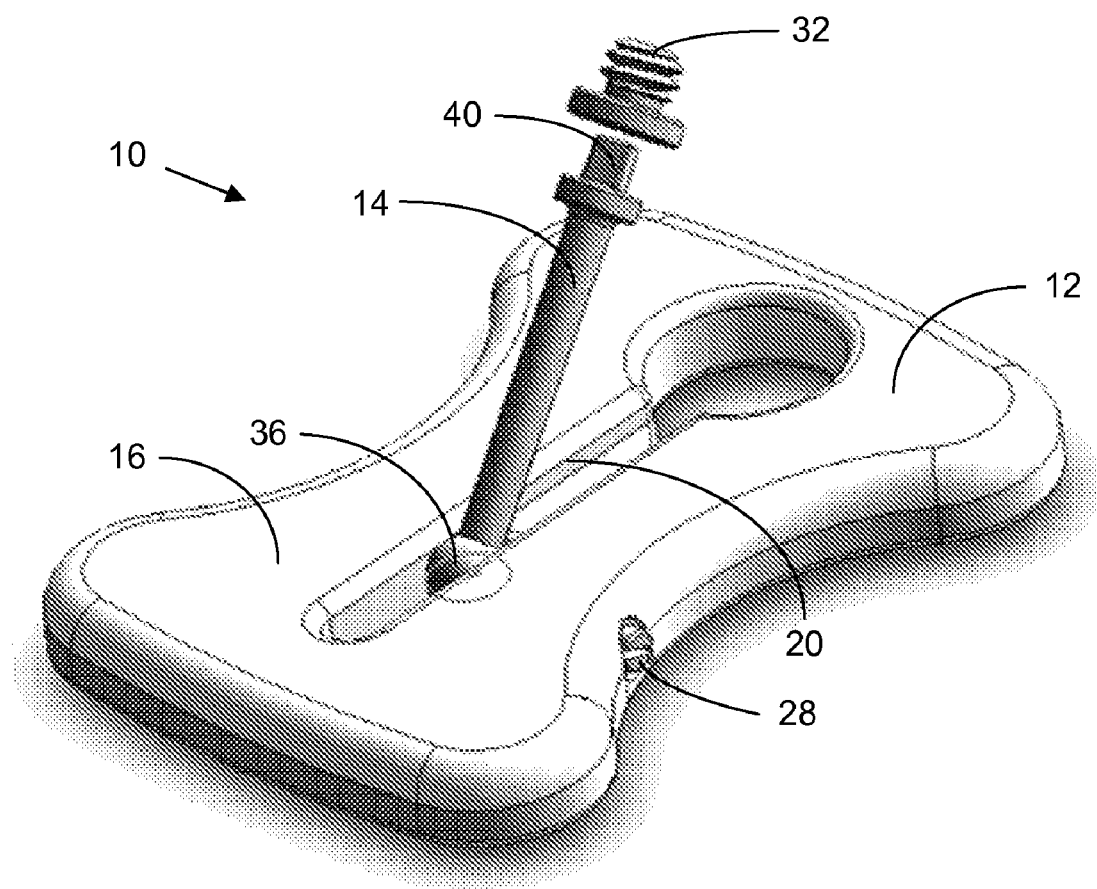
FIG. 9 is a perspective drawing of another embodiment of the support stand, wherein the threaded member is removable from the mounting post.

In another embodiment, illustrated in FIG. 9, the threaded member 32 can be readily attached and removed from the mounting post 14. As shown, the mounting post 14 includes a quick-release extension 40 onto which the threaded member 32 can be fitted. In the illustration, the quick-release extension 40 has a square cross-section, though it can be a variety of other shapes, such as hexagonal or star-shaped, provided that the threaded member 32 has an inversely shaped bore with essentially the same dimensions to match the size and shape of the extension 40 for secure mounting thereon. The separate threaded member 32 can be threaded into a camera or other device and left there. The device can then be very quickly mounted on the support stand 10 by simply sliding the quick-release extension 40 into the bore of the threaded member 32, which is pre-mounted in the device.

In each of the embodiments, such as those of FIGS. 1-8, wherein the threaded member is integral with the mounting post 14, the height of the base 12 (measured orthogonal to the substantially planar extended dimensions of the platform 16) need be no more than the diameter of a threaded member 32 and can generally be about one cm or less. In embodiments, such as that of FIG. 9, where the threaded member 32 is removably mountable on the mounting post 14, the base 12 can have a height of, e.g., 5 mm or less. The base's horizontal dimensions (across the substantially planar extended dimensions of the platform 16) can be about 8 cm by 8 cm or less.

Figure 4:
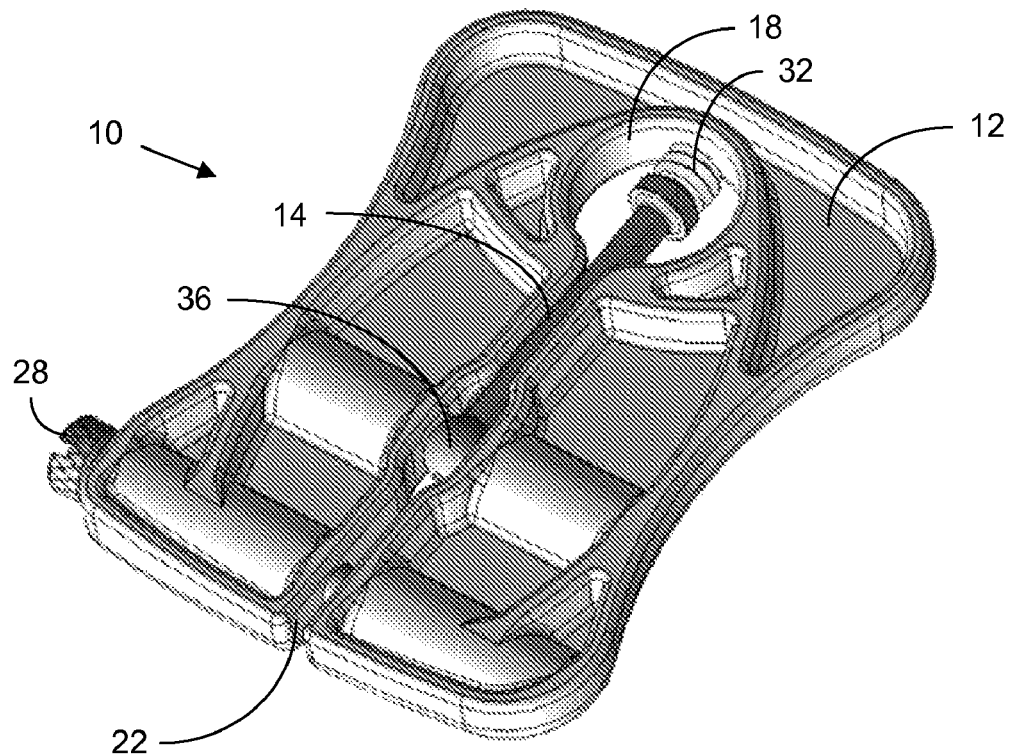
FIG. 4 provides another perspective view of the support stand of FIGS. 1-3, showing the underside of the base.
Figure 5:
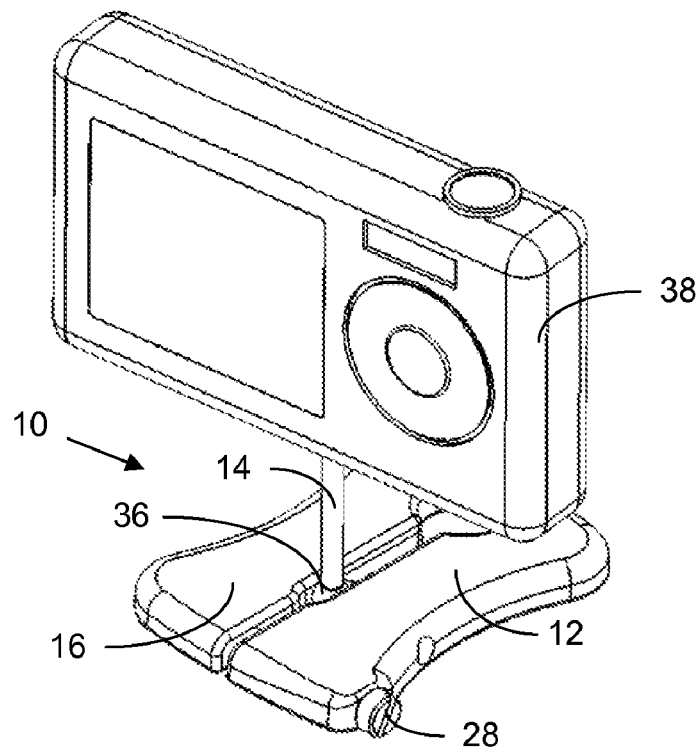
FIG. 5 is a perspective drawing of the support stand of FIGS. 1-4 with a camera mounted on the mounting post.

The underside of the base 12, e.g., as illustrated in FIG. 4, can be have a single substantially planar contact surface for supporting the base 12 on a substantially planar mounting surface, such as a horizontal surface of a table, a floor, a ledge, a chair, etc. Alternatively, the underside of the base 12 can include at least three discrete contact surfaces extending from platform 16, wherein each of the extended contact surfaces is positioned near the perimeter (e.g., at the corners) of the base 12. The contact surfaces can be in the form of non-skid rubber feet that can provide solid, non-marking support on painted surfaces. In other embodiments, the contact surfaces can be on legs that are extendable from (and collapsible back into) the base 12.

The device 38 to be mounted on the threaded member 32 can be any device having a use that is benefited by the device being mounted and re-positionable for greatest advantage. Cameras are one such device and can be provided in the form of a stand-alone film or video camera or as a component on a multi-purpose electronic device. For example, as a stand-alone product, the camera can be either a conventional still camera (digital or film) or a video camera (designed for digital or tape movies). Multi-purpose electronic devices with cameras or microphones embedded therein include, e.g., cell phones and hand-held personal digital assistants (PDA's), such as those made by Palm, Inc.

The device 38 includes a standard mounting connection, typically a threaded bore with a diameter of about ¼ inch and threaded at a density of 20 threads per inch, extending into the camera from an underside surface, such that the inverse threads on the threaded member can be threaded there into to securely lock the device to the threaded member 32.

In describing embodiments of the invention, specific terminology is used for the sake of clarity. For purposes of description, each specific term is intended to at least include all technical and functional equivalents that operate in a similar manner to accomplish a similar purpose. Additionally, in some instances where a particular embodiment of the invention includes a plurality of system elements or method steps, those elements or steps may be replaced with a single element or step; likewise, a single element or step may be replaced with a plurality of elements or steps that serve the same purpose. Moreover, while this invention has been shown and described with references to particular embodiments thereof, those skilled in the art will understand that various other changes in form and details may be made therein without departing from the scope of the invention.

What is claimed is:

1. A collapsible support stand for mounting a camera, the support stand comprising:

a substantially planar base structured for mounting on a surface and having a height of no more than about 1 cm and orthogonal width and length dimensions of no more than about 8 cm, wherein the base includes a spherical ball socket and a hideaway storage slot extending from the socket, and wherein the base is structured to fit alongside a camera in a camera case with all appurtenances to the base contained and shielded by the base when in a folded and closed state to protect the camera;

a mounting post including a spherical ball mounted in the socket of the base to provide the mounting post with three degrees of freedom of movement, including freedom for roll, pitch and yaw, wherein the mounting post can be collapsed into the hideaway storage slot of the base or projected from the base in an orientation orthogonal to its collapsed position, wherein the hideaway storage slot is sized and configured to contain and shield the mounting post without any portion of the mounting post projecting out of the base when the mounting post is in its collapsed position, wherein the base includes a clamping mechanism that can reduce the diameter of the socket so as to secure the mounting post with respect to each degree of freedom orientation for fixed mounting and support of a device on the threaded member, and wherein the clamping member is a threaded screw threaded through the base and across the slot so as to be able to narrow and expand the slot as the clamping member is rotated; and a threaded member integrally or removably attached at an end of the mounting post.

2. The collapsible support stand of claim 1, wherein the mounting post includes a ball that is mounted in the socket of the base to enable the mounting post to be rotated in the socket with the three degrees of freedom.

3. The collapsible support stand of claim 1, wherein the threaded member is threaded to accommodate a standard mounting connection at about 20 threads per inch and with an approximately ¼-inch diameter.

4. The collapsible support stand of claim 1, wherein the support stand has a height, when the mounting post is collapsed into the base, of about 1 cm or less.

5. The collapsible support stand of claim 4, wherein the base, with the mounting post collapsed into it, has dimensions no greater than about 1 cm×8 cm×8 cm.

6. The collapsible support stand of claim 1, further comprising a digital camera mounted on the threaded member, wherein the width and length of the base are substantially equal to or less than those of the mounted digital camera.

7. The collapsible support stand of claim 1, wherein the clamping member is the only adjustable component of the base.

8. The collapsible support stand of claim 1 wherein the threaded member is discrete from the mounting post and is configured for removable attachment to the mounting post via a quick-release extension.

9. The collapsible support stand of claim 1, wherein the slot is sized and configured to also contain the threaded member when the mounting post is in its collapsed position, and wherein the mounting post and threaded member are formed of a first material and wherein the slot is sized to accept the mounting post when collapsed into the base with no external surface of the first material projecting from the base, thereby reducing the risk of scratching a device with the first material when the device is stored with the collapsed support stand.

10. The collapsible support stand of claim 1, wherein the support stand has a height, when configured with the mounting post collapsed into the base and with the threaded member removed from the mounting post, of no more than 5 mm.

11. The collapsible support stand of claim 1, wherein the height of the base is substantially equal to the diameter of the spherical ball on the mounting post and substantially equal to the threaded member.

* * * * *